(12) United States Patent
Wessel et al.

(10) Patent No.: US 9,202,479 B1
(45) Date of Patent: Dec. 1, 2015

(54) HEAT ASSISTED MAGNETIC RECORDING HEAD WITH WRITE COIL HEATSINK

(71) Applicant: Seagate Technology LLC, Cupertino, CA (US)

(72) Inventors: James Gary Wessel, Savage, MN (US); Raul Horacio Andruet, Woodbury, MN (US); Chris Rea, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/560,243

(22) Filed: Dec. 4, 2014

(51) Int. Cl.
*G11B 5/31* (2006.01)

(52) U.S. Cl.
CPC ........................................ *G11B 5/31* (2013.01)

(58) Field of Classification Search
CPC .......... G11B 5/147; G11B 5/187; G11B 5/23; G11B 5/31; G11B 5/33
USPC ............... 360/125.3, 125.31, 125.03, 125.09, 360/125.04, 125.17, 125.12, 125.16, 125.14
See application file for complete search history.

(56) References Cited

U.S. PATENT DOCUMENTS

| | | | |
|---|---|---|---|
| 5,939,624 A * | 8/1999 | Smith, Jr. | 73/105 |
| 6,112,401 A * | 9/2000 | Smith, Jr. | 29/603.12 |
| 6,452,740 B1 | 9/2002 | Ghoshal | |
| 7,102,853 B2 | 9/2006 | Macken et al. | |
| 7,170,713 B2 * | 1/2007 | Gider et al. | 360/128 |
| 7,612,965 B2 | 11/2009 | Kurihara et al. | |
| 8,031,432 B2 | 10/2011 | Hsiao et al. | |
| 8,173,282 B1 * | 5/2012 | Sun et al. | 428/831 |
| 8,286,329 B1 | 10/2012 | Zhao et al. | |
| 8,339,739 B2 * | 12/2012 | Balamane et al. | 360/125.3 |
| 8,451,705 B2 * | 5/2013 | Peng et al. | 369/112.27 |
| 8,486,286 B1 | 7/2013 | Gao et al. | |
| 8,530,065 B1 * | 9/2013 | Chernyshov et al. | 428/829 |
| 8,619,513 B1 * | 12/2013 | Challener et al. | 369/13.33 |
| 8,634,163 B2 * | 1/2014 | Tanabe et al. | 360/125.3 |
| 8,721,902 B1 | 5/2014 | Wang et al. | |
| 8,824,086 B2 * | 9/2014 | Peng et al. | 360/59 |
| 8,953,272 B2 * | 2/2015 | Peng et al. | 360/59 |
| 9,001,465 B1 * | 4/2015 | Shimizu et al. | 360/125.3 |
| 2004/0027719 A1 * | 2/2004 | Gider et al. | 360/128 |
| 2008/0253025 A1 | 10/2008 | Fu et al. | |
| 2010/0214685 A1 * | 8/2010 | Seigler et al. | 360/59 |
| 2011/0026377 A1 * | 2/2011 | Shimazawa et al. | 369/13.24 |
| 2013/0064051 A1 * | 3/2013 | Peng et al. | 369/13.33 |
| 2013/0294208 A1 * | 11/2013 | Peng et al. | 369/13.31 |
| 2014/0355399 A1 * | 12/2014 | Huang et al. | 369/13.17 |
| 2014/0369174 A1 * | 12/2014 | Peng et al. | 369/13.33 |
| 2015/0043106 A1 * | 2/2015 | Yamada et al. | 360/123.05 |
| 2015/0092525 A1 * | 4/2015 | Araki et al. | 369/13.33 |

* cited by examiner

*Primary Examiner* — Allen T Cao (74) *Attorney, Agent, or Firm* — Hollingsworth Davis, LLC (57) ABSTRACT

An apparatus includes a heat assisted magnetic recording (HAMR) head that comprises a write coil, a write coil heatsink, and a spacer. The write coil heatsink is thermally coupled to the write coil. The spacer lies intermediate the write coil and the write coil heatsink.

24 Claims, 7 Drawing Sheets

HEAT ASSISTED MAGNETIC RECORDING HEAD WITH WRITE COIL HEATSINK

SUMMARY

An apparatus of the present disclosure includes a heat assisted magnetic recording (HAMR) head that comprises a write coil, a write coil heatsink, and a spacer. The write coil heatsink is thermally coupled to the write coil. The spacer lies between the write coil and the write coil heatsink.

A method of the present disclosure comprises fabricating a HAMR head. The fabrication includes fabricating a write coil, electrically insulating the write coil, and fabricating a write coil heatsink proximate the electrically insulated write coil.

Another apparatus of the present disclosure comprises a magnetic recording head. The magnetic recording head has an energy source, a write coil, a write coil heatsink, and a spacer. The energy source is configured to heat a recording medium. The write coil heatsink is thermally coupled to the write coil. The spacer is configured to electrically insulate the write coil from the write coil heatsink.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Heat assisted magnetic recording (HAMR) generally refers to the concept of locally heating a magnetic recording medium to reduce coercivity at the heated location. This allows the applied magnetic writing fields to more easily direct the magnetization during the temporary magnetic softening of the medium caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the coercivity is reduced such that the magnetic write field is sufficient to write to the media. Once the media cools to ambient temperature, the coercivity has a sufficiently high value to assure thermal stability of the recorded information.

In order to achieve desired data density, a HAMR recording head (e.g., slider) includes optical components that direct light from a laser to the recording medium. The HAMR media hotspot must be smaller than a half-wavelength of light available from current sources (e.g., laser diodes). Due to what is known as the diffraction limit, optical components cannot focus the light at this scale. One way to achieve tiny confined hot spots is to use an optical near field transducer (NFT), such as a plasmonic optical antenna. The NFT is designed to support local surface-plasmon at a designed light wavelength. At resonance, high electric field surrounds the NFT due to the collective oscillation of electrons in the metal. Part of the field will tunnel into a storage medium and get absorbed, raising the temperature of the medium locally for recording. During recording, a write element (e.g., write pole) applies a magnetic field to the heated portion of the medium. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

A HAMR drive uses a laser diode to excite the NFT which generates a significant amount of heat during excitation, raising peak temperatures on the order of 200 to 400 C above ambient, for example. Various thermal management arrangements are used to dissipate heat generated by the NFT, such as a heatsink between the NFT and a return pole of the writer or other adjacent heat reservoir. The writer also dissipates an appreciable amount of power, on the order of about 20 mW to 50 mW, for example. This amount of writer power can raise temperatures on the order of 100 to 200 C above ambient. Although current HAMR designs provide heatsinking for the NFT, thermal management of heat produced by the writer has heretofore been unaddressed.

Figure 1A:
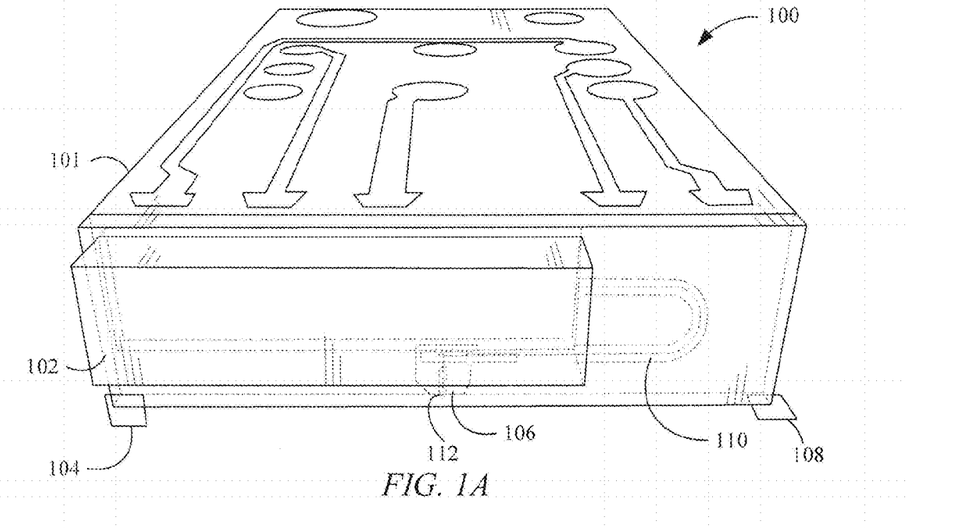
FIGS. 1A and 1B are perspective views of a heat assisted magnetic recording head within which embodiments of the disclosure can be implemented.
Figure 2:
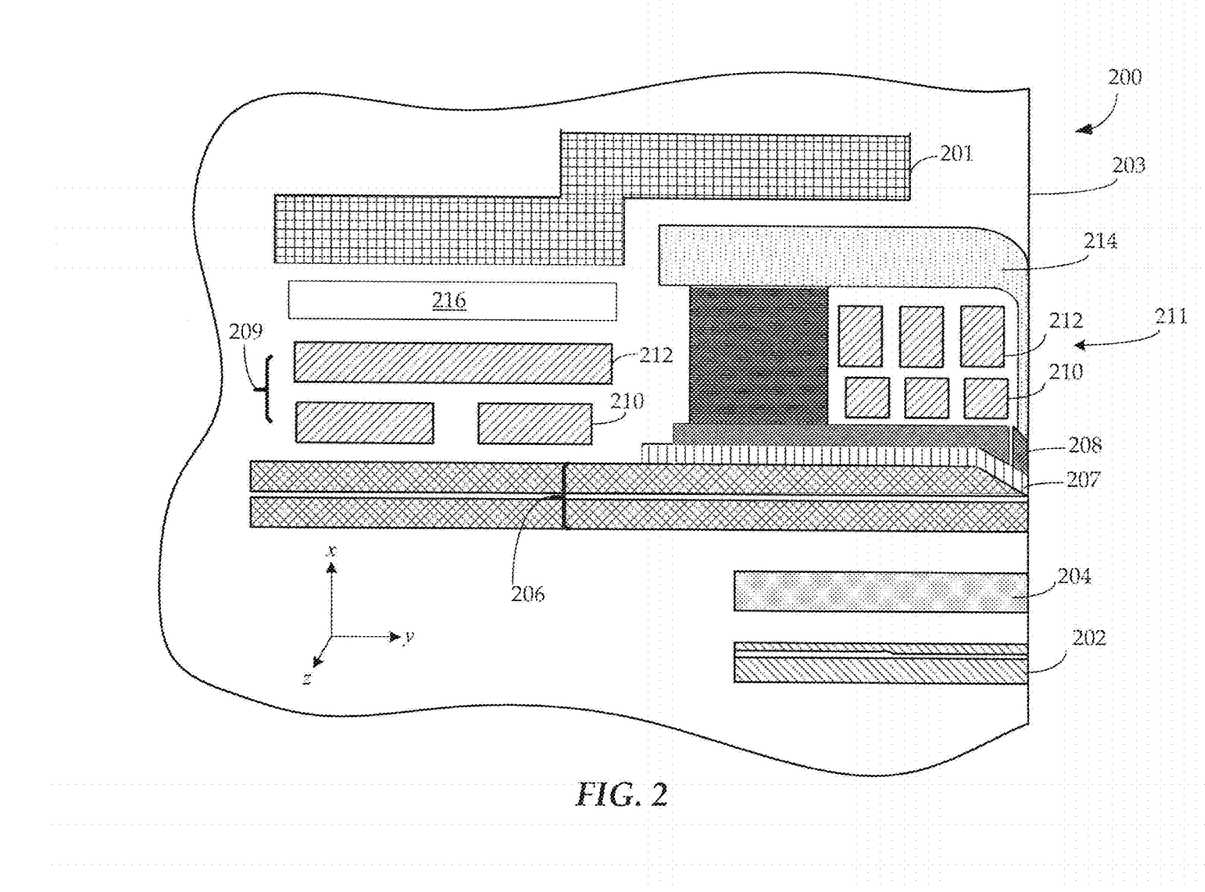
FIG. 2 is a cross-sectional view of a portion of a HAMR head illustrating a write coil heatsink arrangement in accordance with embodiments disclosed herein.

FIGS. 1 and 2 show perspective views of HAMR slider configurations according to representative embodiments. In FIG. 1A, slider 100 has a laser-in-slider (LIS) configuration, in this configuration, slider 100 includes a slider body 101 having an edge-emitting laser diode 102 integrated into a trailing edge surface 104 of the slider body 101. In this example, the laser diode 102 is disposed within a cavity formed in the trailing edge surface 104. The laser diode 102 is proximate to a HAMR read/write element 106, which has one edge on an air bearing surface 108 of the slider 100. The air bearing surface 108 faces and is held proximate to a moving media surface (not shown) during device operation. While here the read/write element 106 is shown as a single unit for simplicity of explanation, this type of device generally has a physically and electrically separate read element (e.g., magnetoresistive stack) and write element (e.g., a write coil and pole) that are located in the same general region of the slider 100. The laser diode 102 provides electromagnetic energy to heat the media surface at a point near to the writer of the read/write element 106. Optical path components, such as a waveguide 110, are formed integrally within the slider 100 to deliver light from the laser diode 102 to the medium. In particular, a local waveguide and NFT 112 may be located proximate the read/write element 106 to provide local heating of the media during write operations.

Figure 1B:
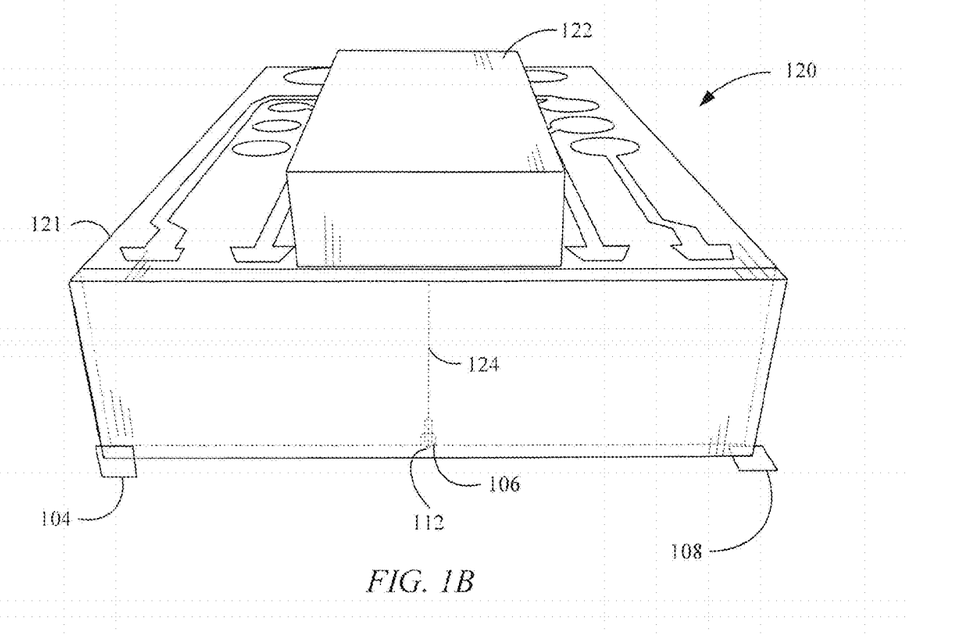

In FIG. 1B, a laser-on-slider (LOS) configuration 120 is illustrated. This example includes a laser diode 122 that is mounted on a top surface of a slider body 121. The laser diode 122 is coupled to an optical path of the slider body 121 that includes, among other things, an optical path 124 (e.g., a straight waveguide). In this configuration, the laser diode 122 may also be edge-emitting, such that the light is emitted from the laser diode 122. In order to direct the light towards the air bearing surface 108, the laser diode 122 (or other component) may include optical path elements such as a mirror (not shown) that redirects the light emitted from the laser diode 122 towards the air bearing surface 108. In other configurations, an edge-emitting, top-mounted laser diode may be oriented so that the light emitted directly downwards toward the air bearing surface 108. This may involve placing the laser diode 122 on a submount (not shown) on the top of the slider body 121, the submount orienting the laser output in the desired direction. While other components shown in FIG. 1B, such as the NFT 112 and read/write element 106, are referenced using the same numbers as FIG. 1A, the physical configuration of these and other components may differ in the different slider arrangements, e.g., due to the differences in optical coupling pathways, materials, laser power, etc.

Due to constraints from the optical subsystem, HAMR heads typically have inefficient magnetic writers. As such, a high write power is needed to achieve good magnetic performance. Examples of optical subsystem impinging on magnetic writer performance are: 1) coils and ferromagnetic layers, e.g. shields, write poles, and return poles, employed by magnetic writers absorb optical energy and therefore must be located away from the light path and 2) the optical layers in the recording media often preclude the use of an efficient magnetic soft underlayer (SUL) in the media. Use of high write power produces undesired consequences including large thermal protrusion of the write pole, which is also known as write induced write protrusion (WIWP), and elevated temperatures inside and near the write coils.

Figure 3:
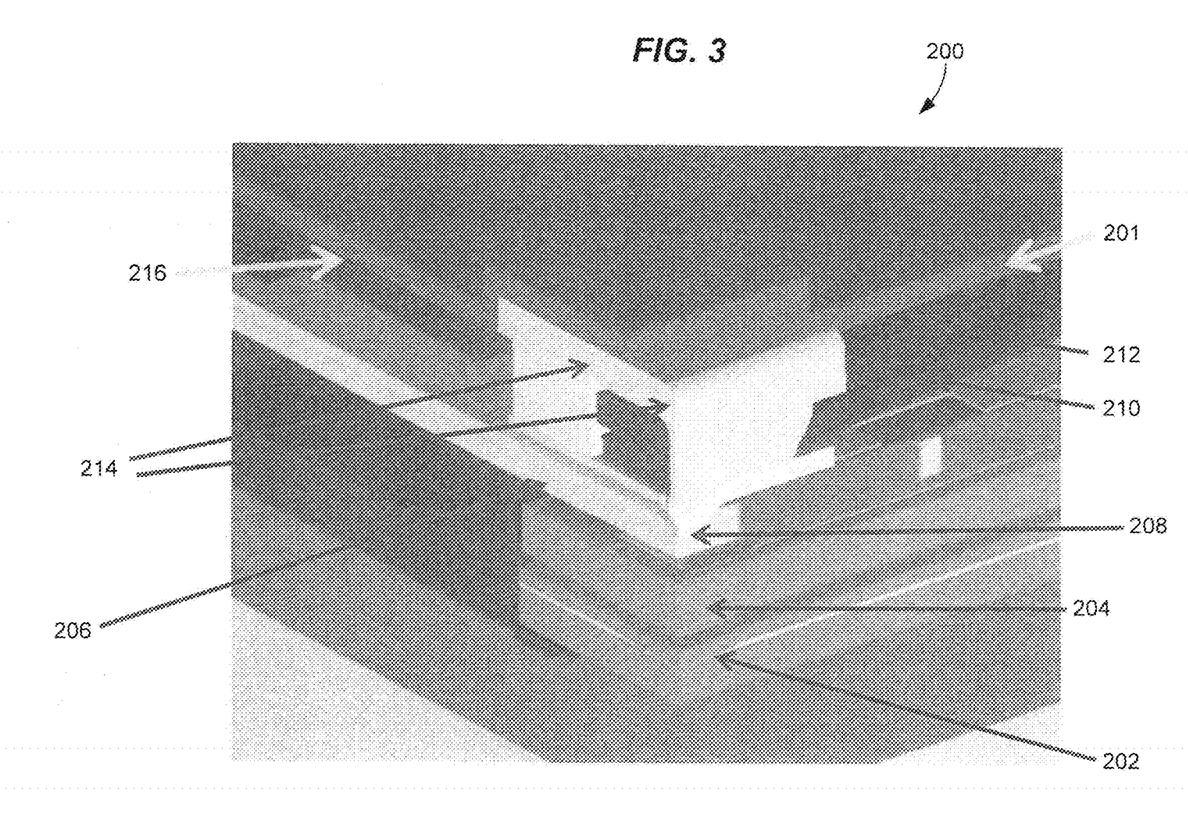
FIG. 3 is a perspective view of a portion of a HAMR head illustrating a write coil heatsink arrangement in accordance with embodiments disclosed herein.

The present disclosure is directed towards HAMR head embodiments configured to reduce or eliminate the undesired consequences of high write power through incorporation of a write coil heatsink arrangement. FIG. 2 provides a cross-sectional view of a portion of an exemplary HAMR head 200 in accordance with various embodiments. FIG. 3 provides a perspective view showing additional features of the HAMR head illustrated in FIG. 2, including the write coil heatsink arrangement. The right edge of the HAMR head shown in FIG. 2 represents an air bearing surface (ABS) 203 of the head 200. Within the depicted portion of the HAMR head 200, various components are identified for reference in establishing a position of a write coil heatsink arrangement according to various embodiments.

With reference to the lower region of FIGS. 2 and 3, a reader 202 is shown proximate a contact pad (and/or alternate flux return path) 204. Proximate the contact pad (and/or alternate flux return path) 204 is an optical waveguide 206, which may be a planar waveguide or a channel waveguide, for example. An NFT 207 is shown situated adjacent the optical waveguide 206 (see FIG. 2). A writer 211 is situated proximate the NFT 207. The writer 211 is shown to include a write pole 208, a lower coil 210, and an upper coil 212 of a double-layer pancake coil design 209 it should be noted that, while the present embodiment utilizes a double-layer pancake coil, the cooling properties of a write coil heatsink may be readily adapted to other coil designs, e.g., single-layer pancake or helical. A write flux return path 214 is shown situated proximate the upper coil 212 of the writer 211.

The HAMR head 200 illustrated in FIGS. 2 and 3 includes a write coil heatsink 201, a portion of which extends along at least a portion of the write flux return path 214. In some embodiments, the portion of the write coil heatsink 201 that extends over the write flux return path 214 can extend further toward the ABS 213 than is shown, thereby enhancing heat transfer of waste heat away from the writer 211. In the illustrative embodiment shown in FIGS. 2 and 3, the write coil heatsink 201 has a large planar portion and a smaller step portion that extends over the write flux return path 214. The smaller step portion of the write coil heatsink 201 is offset from (but connected or continuous with) the large planar portion along both the x and y axes shown in FIG. 2. In this regard, the write coil heatsink 201 constitutes a multi-layer (e.g., multi-level) heatsink arrangement according to some embodiments.

The write coil heatsink 201 provides cooling/heat dissipation for the HAW, head 200. To provide the desired heat dissipation, the write coil heatsink 201 is preferably of a material that provides both high thermal conductivity and low thermal expansion. For thermal conductivity, better results are achieved with higher thermal conductivity. However, gains are observed as long as the thermal conductivity is significantly higher, (for example, one order of magnitude) than alumina, which has a thermal conductivity of ~1 W/m-K. Many metallic elements, e.g Al, Cu, Ag, W, Au, have thermal conductivities greater than the 10 W/m-K target. There are also nonmetals, e.g. MgO, BeO, and AlN, that meet or exceed the target. For thermal expansion, as quantified by the coefficient of thermal expansion (CTE), the lower the better. As with thermal conductivity, a reference to alumina is valuable for determining CTE targets for the write coil heatsink (201). Alumina has a CTE of approximately 4 ppm/K; thus the target CTE the write coil heatsink (201) 4 ppm/K or less.

Figure 4:
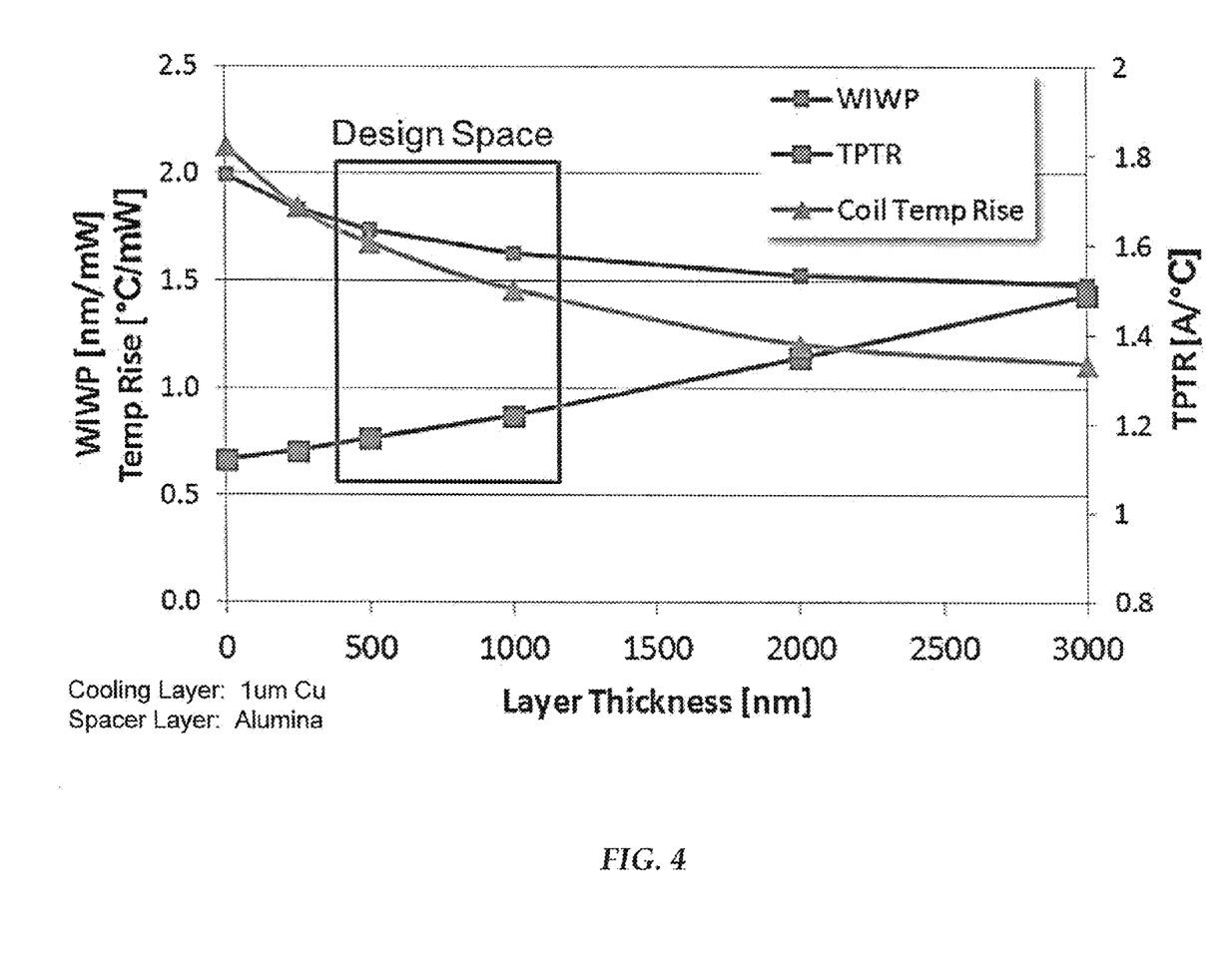
FIG. 4 is a graph illustrating writer induced writer protrusion (WIWP) coil temperature, and thermal pole tip protrusion (TPTR) vs. thickness of a copper write coil heatsink in accordance with various embodiments.

It should be noted that, while beneficial, it is not required for the write coil heatsink (201) material to simultaneously meet the targets for thermal conductivity and CTE. For example, using a material with very high conductivity but larger than—target CTE can still result in WIWP reduction. This is demonstrated in FIG. 4 for a write coil heatsink (201) constructed of copper. Copper has a high CTE of 14 ppm/K, much higher than the ideal CTE, however the conductivity of copper (>200 W/m-K) is so high that the sub optimal CTE is overcome and a net WIWP reduction is observed.

It is found that the write coil heatsink (201) is often most effective if its thickness and dimensions are on the same order as the coils. However, to reduce unfavorable electromagnetic interaction, e.g. capacitance and inductance, it may be preferable in some cases to have the write coil heatsink cover only part of the coils. One example of a particularly suitable material for the write coil heatsink 201 is the elemental metal tungsten due to its moderately high conductivity (~60 W/m-K) and unusually, for metals, low CTE of ~4 ppm/K. Other examples of suitable materials for the write coil heatsink 201 include engineered materials, e.g., laminates or composites, which provide the desired mechanical and thermal properties. Of particular utility, are laminates, e.g. CuW, AgW or CuSiC, consisting of a material with low CTE and a different material with high thermal conductivity.

As is best seen in FIG. 2, a spacer 216 is situated between the coil 209 itself and the write coil heatsink 201. The spacer 216 operates to prevent electrical shorting of the write coil 209. As such, the spacer 216 is suitably of an electrical insulating material that has good thermal conductivity. Electrical insulators typically used in the construction of recording heads, e.g., alumina or silica, have low thermal conductivity (~1 W/m-K). This low conductivity impedes heat flow between the coil 209 and the write coil heatsink 201 and is, therefore, undesirable. As such, materials of high thermal conductivity are preferred for the spacer 216. Examples of suitable electrically insulating, high thermal conductivity materials for the spacer 216 include AlN, MgO. BeO, and diamond. Other dielectrics and metals that have good electrical insulating and thermal conductivity properties are contemplated. As noted earlier, for thermal conductivity, the higher the better. However, gains are observed as long as the thermal conductivity is significantly higher, say one order of magnitude, than alumina or silica.

Comparison modeling was performed between a baseline configuration of a HAMR head, e.g., a HAMR head that does not have a heat dissipating write coil heatsink, and a write coil heatsink configuration of a HAMR head according to various embodiments. The results of the comparison are provided in the graph of FIG. 4. The graph illustrates WIWP, coil temperature, and thermal pole tip protrusion (TPTR) vs. the thickness of a copper write coil heatsink. Notably, temperature and WIWP improve as the write coil heatsink is made thicker. The write coil heatsink used in the model was made of copper. While copper is a very good conductor, making it effective at heat dissipation, it does have undesirable thermal expansion. As such, the reader is referred to more desirable write coil heatsink materials described in the paragraphs above.

Figure 5:
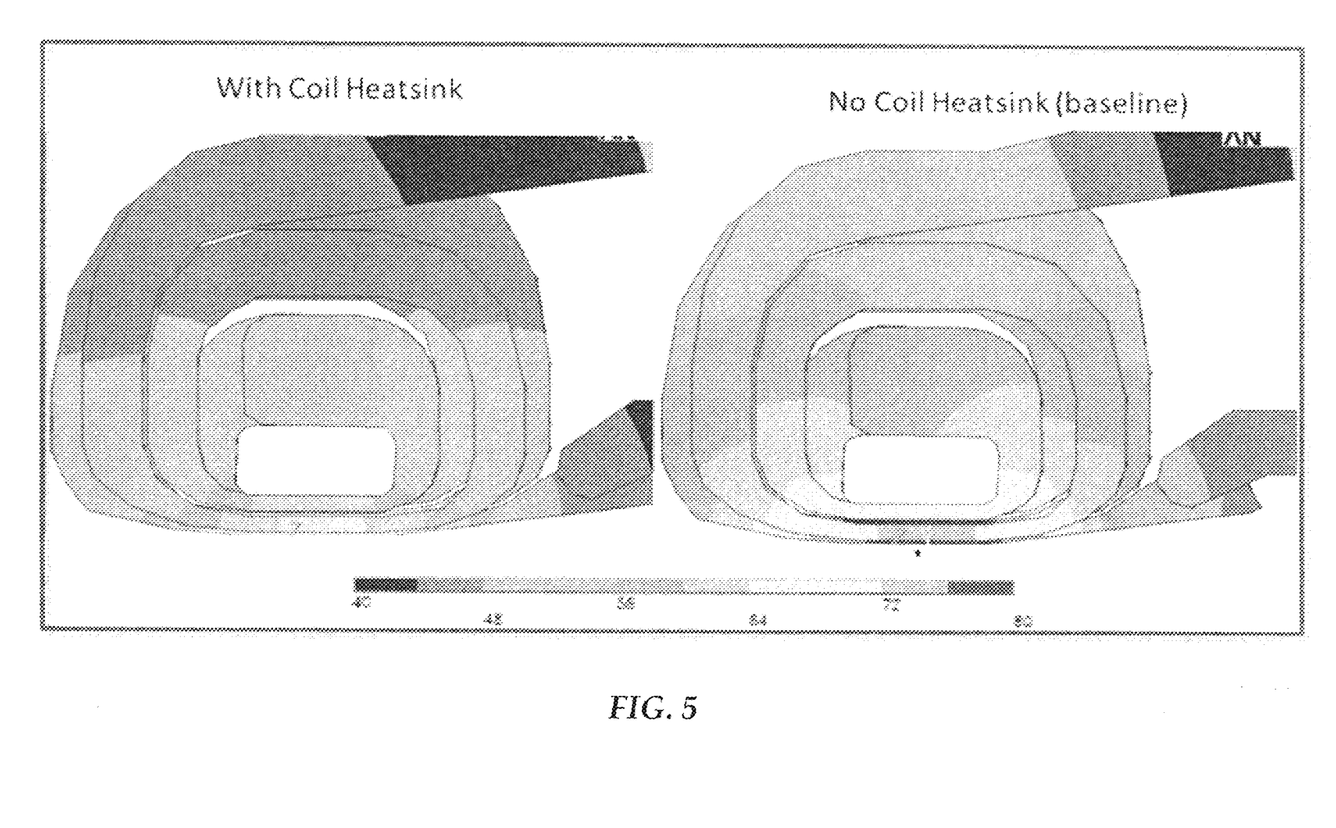
FIG. 5 is a top down map of coil temperature comparing a baseline head with a write coil heatsink head in accordance with various embodiments.

Further results of the comparison modeling are provided in the top down map of coil temperature provided in FIG. 5. As illustrated, the coil temperature of the coil-with-heatsink configuration of the HAMR head (illustration on the left) is notably cooler than the coil temperature of the baseline configuration of the HAMR head (illustration on the right). For example, the average coil temperature at the hottest location in the write coil was reduced by about 10° C. (approximately a 20% reduction) by inclusion of a write coil heatsink arrangement according to embodiments of the disclosure.

Figure 6:
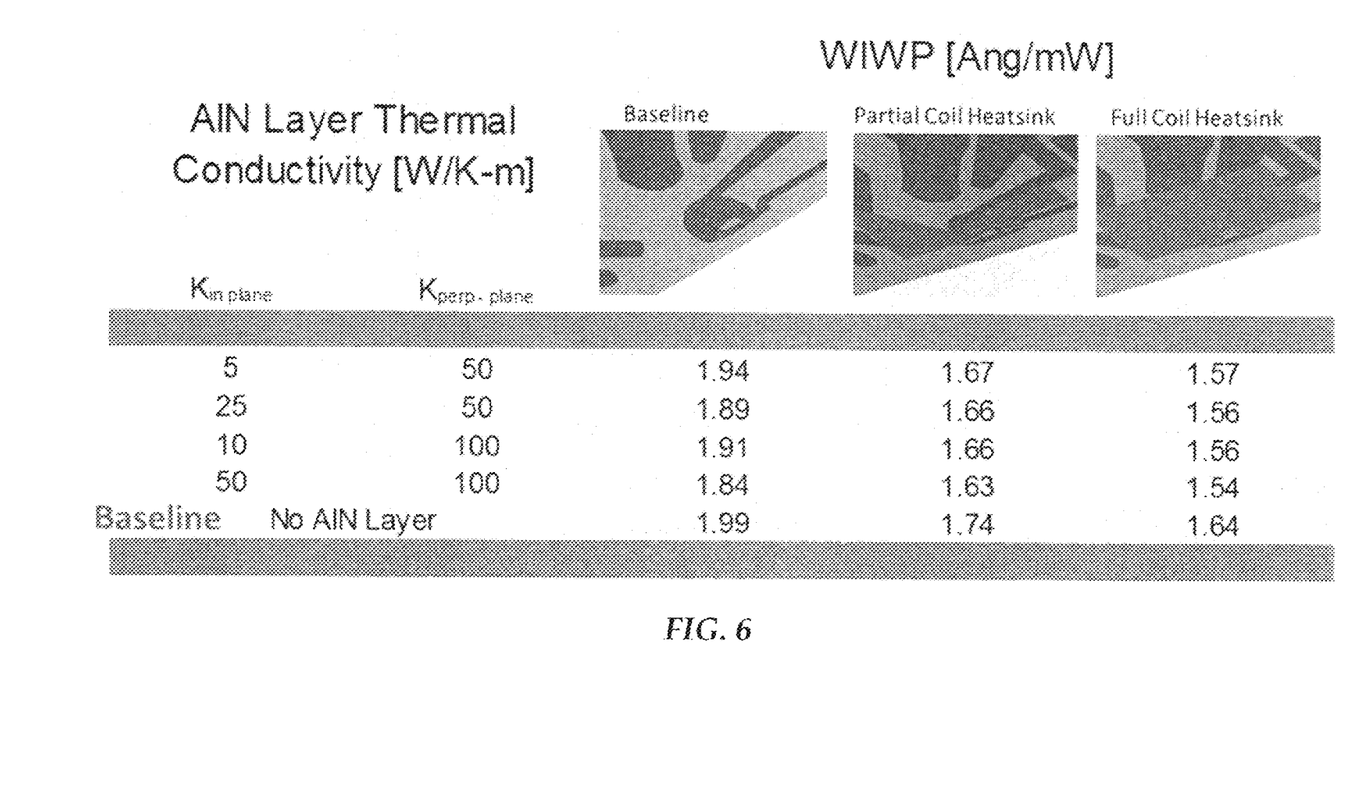
FIG. 6 is a chart illustrating WIWP vs. thermal conductivity of a spacer in a baseline head, partial write coil heatsink head and full write coil heatsink head in accordance with various embodiments.

Another comparison was performed between the baseline HAMR head, a partial write coil heatsink HAMR head, and a full write coil heatsink HAMR head, results from which are shown in FIG. 6. The term full write coil heatsink HAMR head refers to a heatsink arrangement of the type shown in FIGS. 2 and 3. In many cases, the write coil heatsink does work best if extends over the entire coil. However, in some cases, it may be desirable to reduce unfavorable electromagnetic interaction, e.g. capacitance and inductance; in such an instance, it may be preferable to have the write coil heatsink cover only part of the coils. By utilizing a partial write coil heatsink, WIWP and temperatures can be reduced somewhat without degrading electromagnetic operation of the coils, in the three configurations of FIG. 6, the WIWP relative to thermal conductivity of the spacer (made of AlN) was recorded. As illustrated, the WIWP is generally reduced in all three configurations as the thermal conductivity of the spacer is increased.

Figure 7:
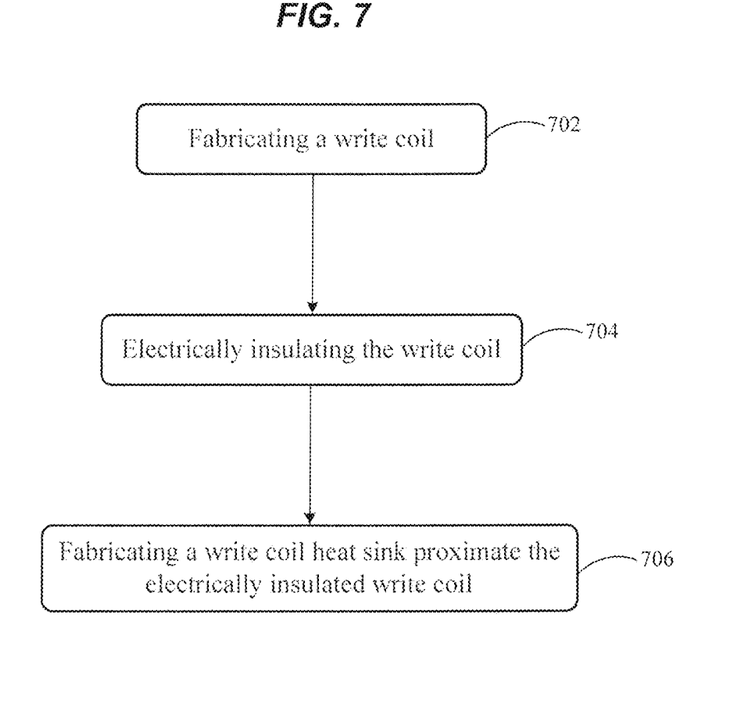
FIG. 7 is a flow chart showing a method of fabricating a HAMR head that incorporates a write coil heatsink arrangement in accordance with various embodiments.

Referring now to the flowchart of FIG. 7, a generalized procedure for manufacturing HAMR head in accordance with the present disclosure includes: (a) fabricating a write coil 702; (b) electrically insulating the write coil 704; and (c) fabricating a write coil heatsink proximate the electrically insulated write coil 706.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
    a heat assisted magnetic recording (HAMR) head comprising:
        a write coil,
        a near-field transducer; and
        an optical waveguide proximate the near-field transducer;
    a write coil heatsink thermally coupled to the write coil; and
    a spacer between the write coil and the write coil heatsink.

2. The apparatus of claim 1, wherein the write coil heatsink comprises a material having a thermal conductivity greater than 10 W/m-K.

3. The apparatus of claim 1, wherein the write coil heatsink comprises a material having a thermal expansion in the range of 4 to 15 ppm/K.

4. The apparatus of claim 1, wherein the write coil heatsink comprises a material having a thermal expansion of less than 4 ppm/K.

5. The apparatus of claim 1, wherein the spacer comprises an electrical insulator and wherein the electrical insulator comprises a material having thermal conductivity greater than 10 W/m-K.

6. The apparatus of claim 1, wherein the write coil heatsink comprises a partial write coil heatsink.

7. The apparatus of claim 1, wherein the write coil comprises a helical coil, a single-layer pancake coil, or a double-layer pancake coil.

8. The apparatus of claim 1, wherein the write coil comprises a double-layer pancake coil having an upper coil and a lower coil, and wherein the write coil heatsink is proximate the upper coil.

9. A method, comprising:
    fabricating a heat assisted magnetic recording (HAMR) head comprising:
        fabricating a write coil;
        electrically insulating the write coil;
        fabricating a write coil heatsink proximate the electrically insulated write coil.

10. The method of claim 9, wherein the write coil heatsink comprises a material having a thermal conductivity greater than 10 W/m-K.

11. The method of claim 9, wherein the write coil heatsink comprises a material having a thermal expansion in the range of 4 to 15 ppm/K.

12. The method of claim 9, wherein the write coil heatsink comprises a material having a thermal expansion less than 4 ppm/K.

13. The method of claim 9, wherein the spacer comprises an electrical insulator and wherein the electrical insulator comprises a material having thermal conductivity greater than 10 W/m-K.

14. The method of claim 9, wherein the write coil heatsink comprises a partial write cod heatsink.

15. The method of claim 9, wherein fabricating the write coil comprises fabricating a helical coil, a single-layer pancake coil, or a double-layer pancake coil.

16. The method of claim 9, wherein fabricating the write coil comprises fabricating a double layer pancake coil having an upper coil and a lower coil, and wherein fabricating a write coil heatsink comprises fabricating the write coil heatsink proximate the upper coil.

17. An apparatus, comprising:
- a magnetic recording head having an energy source configured to heat a recording medium;
- a write coil within the magnetic recording head;
- a write coil heatsink within the magnetic recording head, wherein the write coil heatsink is thermally coupled to the write coil; and
- a spacer within the magnetic recording head, wherein the spacer is configured to electrically insulate the write coil from the write coil heatsink.

18. The apparatus of claim 17, wherein the write coil heatsink comprises a material having a thermal conductivity greater than 10 W/m-K.

19. The apparatus of claim 18, wherein the write coil heatsink comprises a material having a thermal expansion in the range of 4 to 15 ppm/K.

20. The apparatus of claim 17, wherein the write coil heatsink comprises a material having a thermal expansion less than 4 ppm/K.

21. The apparatus of claim 17, wherein the spacer comprises a material having thermal conductivity greater than 10 W/m-K.

22. The apparatus of claim 18, wherein the write coil heatsink comprises a partial write coil heatsink.

23. The apparatus of claim 18, wherein the write coil comprises a helical coil, a single-layer pancake coil, or a double-layer pancake coil.

24. The apparatus of claim 23, wherein the write coil comprises the double-layer pancake coil having an upper coil and a lower coil, and wherein the write coil heatsink is proximate the upper coil.

* * * * *